(12) United States Patent
Shani

(10) Patent No.: US 6,363,482 B1
(45) Date of Patent: Mar. 26, 2002

(54) SECURE BROADBAND COMMUNICATION

(75) Inventor: Benjamin Shani, Netanya (IL)

(73) Assignee: Harmonic Data Systems, Ltd., Tel Aviv (IL)

(*) Notice: Subject to any disclaimer, the term of this patent is extended or adjusted under 35 U.S.C. 154(b) by 0 days.

(21) Appl. No.: 08/925,166

(22) Filed: Sep. 8, 1997

(51) Int. Cl.[7] .............................................. G06P 01/24
(52) U.S. Cl. ........................ 713/168; 713/169; 713/172
(58) Field of Search ................................ 380/278, 281, 380/282, 283, 284, 285, 44; 713/168, 169, 170, 171, 172

(56) References Cited

U.S. PATENT DOCUMENTS

| | | | |
|---|---|---|---|
| 5,208,858 A | 5/1993 | Vollert et al. | |
| 5,319,712 A | 6/1994 | Finkelstein et al. | |
| 5,347,304 A | 9/1994 | Moura et al. | |
| 5,483,596 A | 1/1996 | Rosenow et al. | |
| 5,923,756 A * | 7/1999 | Shambroom | 380/21 |
| 5,933,503 A * | 8/1999 | Schell et al. | 380/25 |
| 5,940,516 A * | 8/1999 | Mason et al. | 380/49 |

FOREIGN PATENT DOCUMENTS

| WO | 96/41448 | 6/1996 |
|---|---|---|

OTHER PUBLICATIONS

Brochure from Zenith and US Robotics, re data modem communications, Zenith Network Systems, Data Business Unit, 1000 Milwaukee Ave., Glenview, IL 60025, no date given.

* cited by examiner

*Primary Examiner*—Thomas R. Peeso

(57) ABSTRACT

A system for secure broadband communication, including: (a) a server device for transmitting data; and (b) a client device including a broadband modem for receiving data, the broadband modem including: (i) a public hardware identification key for being sent to the server device, such that the client device is identified by the public hardware identification key and such that the server device permits transmission to the client device through the broadband modem according to the public hardware identification key, and (ii) a private hardware identification key for controlling reception of data by the client device through the broadband modem, the private hardware identification key being known by the server device, such that substantially only data being marked by the private identification key is passed to the client device from the server device by the broadband modem.

30 Claims, 3 Drawing Sheets

SECURE BROADBAND COMMUNICATION

FIELD AND BACKGROUND OF THE INVENTION

The present invention relates to secure broadband communication and, in particular, to secure communication between a client device, such as a PC (Personal Computer) computer, and a server device such as an Internet Service Provider (ISP) via broadband networks, including wireless networks such as cable or satellite links.

The Internet is a global, linked web of thousands of networks, each with thousands of servers with vast arrays of information. The speed of transmission varies considerably for different nodes on this web of networks. For example, academic institutions and large private companies have direct, fast links to the Internet via high-speed leased telephone lines or high-speed broadband switched digital services. However, the average computer user must communicate with an ISP via a low-speed telephone modem, as these higher speed technologies are too expensive and complicated for the average consumer. Thus, most average computer users must spend lengthy periods waiting for the desired information to be received, or "downloaded", from their ISP.

Recently, broadband networks have been proposed as a solution to this problem. These broadband networks can include wireless cable or satellite links, and typically transmit data hundreds of times faster than existing low speed telephone networks. To make such service even more accessible to the average user, such networks are sometimes used for downstream communication from the ISP to the client device, while upstream communication is done through a telephone modem. In this case, the computer user need only purchase one additional hardware device, a broadband modem, in order to obtain fast broadband network service.

However, such broadband network service, particularly through wireless networks, has added new problems. For example, wireless networks are potentially easily accessed by intruders, leaving data transmissions vulnerable to unauthorized interceptions. If two different networks are used for upstream and downstream communication, different types of hardware at the ISP must send and receive data, thereby requiring coordination between these types of hardware. Finally, transmitting data to a specific user is more complicated with broadband networks than with telephone networks, since data is broadcast to many users simultaneously so that the client device must select the correct data to be received. Thus, security and selectivity of reception of data are challenges for broadband networks and for the broadband modems used on these networks.

One attempt to solve the problem of security for broadband modems is disclosed in U.S. Pat. No. 5,347,304, which describes a remote link adapter for use in receiving TV data broadcasts. This remote link adapter includes a standard digital encryption standard (DES) chip-set for security, and a digitally encoded address. However, no provision is made for security during the "login" procedure, when the client device first connects to the ISP. As disclosed in U.S. Pat. No. 5,347,304, the required keys are distributed during "login". Should the "login" procedure be intercepted by an unauthorized user, the security of the system would be compromised. Furthermore, the requirement for transmission of keys each time "login" occurs is complicated and cumbersome for the ISP or other data source, since such a source must incorporate the transmitted keys every time the user desires access. Thus, the device disclosed in U.S. Pat. No. 5,347,304 is both cumbersome and lacks security.

There is therefore a need for, and it would be highly desirable to have, a system for secure communication on a broadband network, which would allow specific reception of data by a designated client device and which would prevent access by unauthorized users, yet which is simple and secure to use.

SUMMARY OF THE INVENTION

According to the teachings of the present invention there is provided a system for secure broadband communication, including: (a) a server device for transmitting data; and (b) a client device including a broadband modem for receiving data, the broadband modem including: (i) a public hardware identification key for being sent to the server device, such that the client device is identified by the public hardware identification key and such that the server device permits transmission to the client device through the broadband modem according to the public hardware identification key, and (ii) a private hardware identification key for controlling reception of data by the client device through the broadband modem, the private hardware identification key being known by the server device, such that substantially only data being marked by the private identification key is passed to the client device from the server device by the broadband modem.

Preferably, the data is encrypted by the server device with the private hardware identification key, such that only the broadband modem can de-encrypt the data. Alternatively and preferably, the data is encrypted with both the private hardware identification key and the public hardware identification key. Also alternatively and preferably, the data is marked both with the public hardware identification key and the private hardware identification key.

According to a preferred embodiment of the present invention, the server device also includes an access server and a transmitter gateway, the access server featuring a database of public and private hardware identification keys such that the public identification key of the client device is used to determine the private hardware identification key of the client device, the private hardware identification key being given to the transmitter gateway such that the transmitter gateway marks the data with the private hardware identification key. Preferably, the transmitter gateway further encrypts the data with the private hardware identification key. Alternatively and preferably, the transmitter gateway further encrypts the data with both the private hardware identification key and the public hardware identification key.

According to another preferred embodiment of the present invention, the broadband modem includes a packet filter for determining if the data is marked with the private hardware identification key, such that the packet filter passes the data to the client device substantially only if the data is marked with the private hardware identification key. Preferably, the client device further includes a communication card for sending data to the server device, such that the communication card sends the public hardware identification key to the server device.

Also according to the present invention, there is provided a method of marking transmitted data for reception by a client device, the method including the steps of: (a) receiving a public hardware identification key from the client device; (b) determining a private hardware identification key from the public hardware identification key; and (c) marking the data to be transmitted with the private hardware identification key, such that the client device only receives data marked with the private hardware identification key.

Preferably, the data are encrypted with the private hardware identification key. Alternatively and preferably, the data are encrypted with both the private hardware identification key and the private hardware identification key.

Hereinafter, the term "ISP" refers to an Internet Service Provider, which includes any server device providing information to a client device. For example, an ISP could be a server computer which enables a client computer to receive and/or transmit information to or from a network. Hereinafter, the term "network" includes any LAN (local area network), WAN (wide area network), or any other connection between two computers or similar devices.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system for secure broadband communication, in which data is transmitted to a client device from a server device. The client device has a broadband modem with two keys, a public hardware identification key and a private hardware identification key. The public hardware identification key is sent to the server device when the client device is to receive data, or "login" to the server device. The server device uses the public hardware identification key to look up the private hardware identification key, and then marks the data to be transmitted with the private hardware identification key. The client device has a broadband modem which only receives data marked with the private hardware identification key. Thus, both security and specificity are ensured with this system since:

1. Only one key is sent to the server device as an identification during "login", thus preventing unauthorized users from intercepting both keys by monitoring transmissions;
2. Even if the public key is obtained, unauthorized users will not be able to receive data without the private key; and
3. If the private key is also used for encryption, unauthorized users will not be able to process and understand data without the private key.

Of course, if both public and private keys are used for marking and encrypting the data, the level of security is even further increased. Furthermore, since the private key is given to the server device once and does not need to be sent during "login", this key is protected from interception. Having two keys encoded in the hardware of the broadband modem simplifies communication for the average computer user, since the user does not need to be aware of the existence or use of these keys for "login" and for data transmission. Finally, the system as described above is less susceptible to human error since the two keys are hardware encoded and therefore do not need to be entered or manipulated by a human user.

The principles and operation of a system for secure broadband communication according to the present invention may be better understood with reference to the drawings and the accompanying description.

Figure 1:
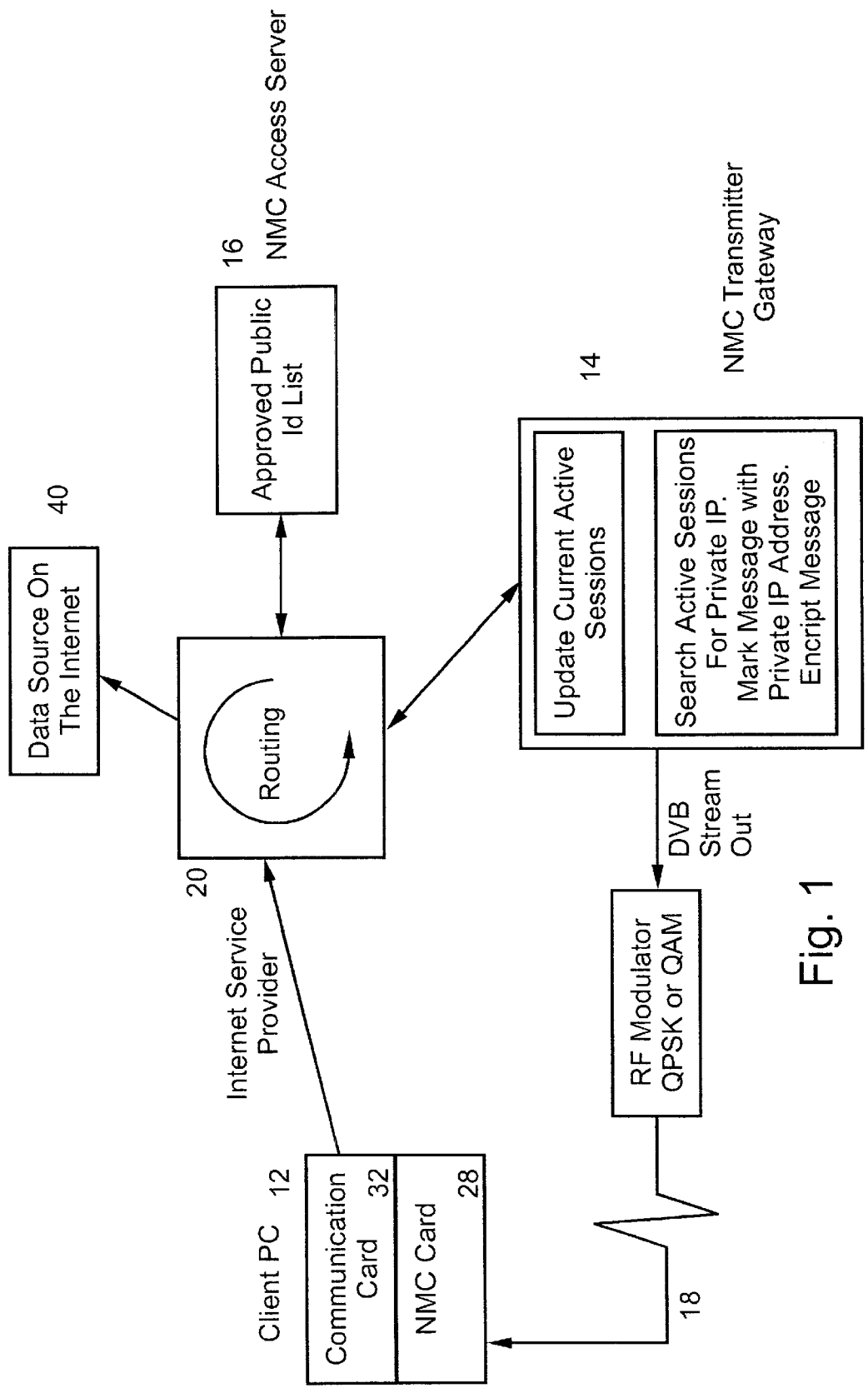
FIG. 1 is a diagram of a secure broadband system according to the present invention.

Referring now to the drawings, FIG. 1 is a diagram of a secure broadband system according to the present invention. A broadband system 10 includes at least one, and preferably a plurality of, client devices 12, a data source 40, a server device which is an ISP (Internet Service Provider) 20 which also includes a transmitter gateway 14 and an access server 16, and a broadband network 18. Data is transmitted from data source 40 along broadband network 18 to ISP 20 and then to client device 12. Access to broadband network 18, and thus the flow of information along broadband network 18, is controlled and regulated by transmitter gateway 14 and access server 16.

Broadband network 18 is characterized by having large amounts of available bandwidth, as well as by the simultaneous broadcast of information across this bandwidth. Broadband network 18 can be a one or two way cable network, a wireless cable network such as MMDS or LMDS, or a satellite link, for example. Hereinafter the term "wireless" refers to the transmission of data without the use of coax or fiber/coax networks. Examples of wireless broadband networks include, but are not limited to, wireless cable networks and satellite links. The high bandwidth of broadband network allows large amounts of data to be transmitted. For example, a cable television network can transmit 4 gigabits of data per second. This has the advantage of allowing client device to receive large segments of information, such as complicated graphics, without requiring long periods of time for "downloading" or receiving this information.

One particular feature of broadband network 18 is that the transmission of data can be in broadcast form, in which the data is sent one-way from a data source 40 to client device 12. However, the return channel for data from client device 12 does not need to be on broadband network 18. Thus, data can be sent from client device 12 through another network, such as a regular telephone network 22, as shown in FIG. 1. Hereinafter, the term "telephone network" will be used to designate any network other than broadband network 18 including, but not limited to, narrow band cable, ISDN or radio.

Client device 12 communicates with broadband network 18, and with telephone network 22 if present, through at least one communication device 24, further described below. Communication device 24 can be connected to client device 12 either externally or internally, and preferably includes both a communication card 26 and a broadband modem 28. An example of an internal device is a card which is inserted on an expansion slot in a PC computer. The identity of the specific hardware device or devices employed is less important than particular features of this device, as further described below.

In order for the user to communicate with ISP 20, the following procedure is used. First, the user must set up access, or "login" into ISP 20. Client device 12 establishes a connection with ISP 20, for example through communication card 26. Communication card 26 transmits data to, and receives data from, telephone network 22. An example of communication card 26 is a telephone modem. However, for the purposes of the present description, communication card 26 may only transmit data from client device 12 to telephone network 22. Thus, communication card 26 controls the transmission of data upstream from client device 12 to ISP 20.

Once client device 12 has established a connection to ISP 20, information such as the name of the user and the password of the user are sent from client device 12 to ISP 20. Such information can be entered manually by the user of client device 12, for example. If ISP 20 approves the connection with client device 12, ISP 20 then sends an IP address to client device 12, through communication device 24. Preferably, the IP address is sent through communication card 26.

Now the user must set up access, or "login" into access server 16. Client device 12 establishes a connection with access server 16 through communication device 24. Once the connection has been established, information such as the IP address which was sent from ISP 20, the user name and a public hardware identification key are sent from client device 12 to access server 16. The public hardware identification key is further described below.

If the connection to access server 16 is approved, then access server 16 sends the IP address, user name and a private hardware identification key to ISP 20, which then sends the information to transmitter gateway 14. The private hardware identification key is also further described below. Transmitter gateway 14 now regulates the flow of information downstream through broadband network 18 to client device 12 via broadband modem 28 as described in more detail below.

As noted previously, two important pieces of information which are required for a complete connection to be established between ISP 20 and client device 12 are the public and private hardware identification keys. These keys both enable each client device 12 to be individually identifiable and permit encryption of data, which should preferably be available to further secure data transmission. These keys are contained within communication device 24. As shown in FIG. 1, communication device 24 preferably includes two separate devices for separate communication with broadband network 18 and telephone network 22, communication card 26 and broadband modem 28. Preferably, the two keys are contained within broadband modem 28, specific details of which are given in FIG. 2.

The two unique hardware identification keys are preferably coded in the hardware of broadband modem 28. These keys are internal to the ASIC chip set and are burned into the chip during the manufacturing process. Thus, both identification keys are placed on broadband modem 28 when it is being manufactured. The first hardware identification key 30 is public and can be accessed by any communications software. The second hardware identification key 32 is private and can only be accessed by the hardware of broadband modem 28. No external access of the private hardware identification key is possible. Thus, private hardware identification key 32 is both unique and protected from discovery or corruption.

The function of these two hardware keys is to regulate the flow of data to broadband modem 28, so that only data intended for client device 12 is passed to that device. Private hardware identification key 32 and public hardware identification key 30 are also preferably used for data encryption, as further described in FIG. 2. These features are the core of secure broadband communications system 10 of the present invention. The operation of these keys 30 and 32 within system 10 of the present invention is as follows.

In order for public hardware identification key 30 to be sent from client device 12 to access server 16, public hardware identification key 30 is accessible by communications software, including the software which allows broadband modem 28 and communication card 26 to communicate with each other and with client device 12. This software gives public hardware identification key 30 to communication card 26. Communication card 26 then transmits public hardware identification key 30 and the IP address of client device 12 to access server 16 as part of the "login" procedure described above. Access server 16 has a database 34 which contains public hardware identification keys 30 for all client devices 12. Database 34 also contains private hardware identification keys 32 for all client devices 12. As noted above, private hardware identification key 32 is not accessible from outside broadband modem 28. However, private hardware identification key 32 is given to database 34 of access server 16 once, when client device 12 is first added to broadband network 18. Thus, database 34 of access server 16 has both public identification key 30 and private hardware identification key 32.

Access server 16 compares public hardware identification key 30 transmitted from communication card 26 to information within database 34. If public hardware identification key 30 is on an approved list, at least private hardware identification key 32, and preferably both public hardware identification key 30 and private hardware identification key 32, are passed to transmitter gateway 14. Additional information within database 34 may be used to determine approval, such as an authorization code and a user name. The authorization code could be based upon the type of user account, payment status, and other relevant information required by ISP 20, for example. Such additional information is optional and would depend upon the requirements of the final destination for the data. The most important step in this process would be the transmittal of public hardware identification key 30 to transmitter gateway 14. Preferably, the decision made by access server 16, either approval or denial of the "log on", is then passed back to communication card 26 as a confirmation of transmission.

If the decision is an approval of the "log on", transmitter gateway 14 preferably receives both public hardware identification key 30 and private hardware identification key 32, and the IP address of client device 12, from access server 16. Transmitter gateway 14 then updates a list of current active sessions, which indicates the users who are logged on and their public and private hardware identification keys 30 and 32. Now client device 12 is fully connected to ISP 20.

When the user wants to receive information from a data source 40, such as a graphic for example, a request is sent from client device 12 to ISP 20. This request includes both the IP address of a data source 40 and the IP address of client device 12, in addition to a request for a specific action, such as downloading information through FTP (File Transfer Protocol), for example. ISP 20 now transmits the requested action to data source 40. Data source 40 then sends an answer to ISP 20.

Now the answer must be properly routed to client device 12 as follows. ISP 20 gives the answer, the IP address of client device 12 and the IP address of data source 40 to transmitter gateway 14. Transmitter gateway 14 then determines the corresponding private hardware identification key 32 for the IP address of client device 12. The data is then encoded with private hardware identification key 32 and sent to the correct IP address.

The term "encode" indicates either simply marking the data with private hardware identification key 32 as a form of identification, or preferably actually using private hardware identification key 32 as the basis for encryption of the data. Such encryption can be done according to any well known method in the art, including DES (data encryption standard), or public or private key encryption. Alternatively and preferably, both public hardware identification key 30 and private hardware identification key 32 can be used for such encoding.

Figure 2:
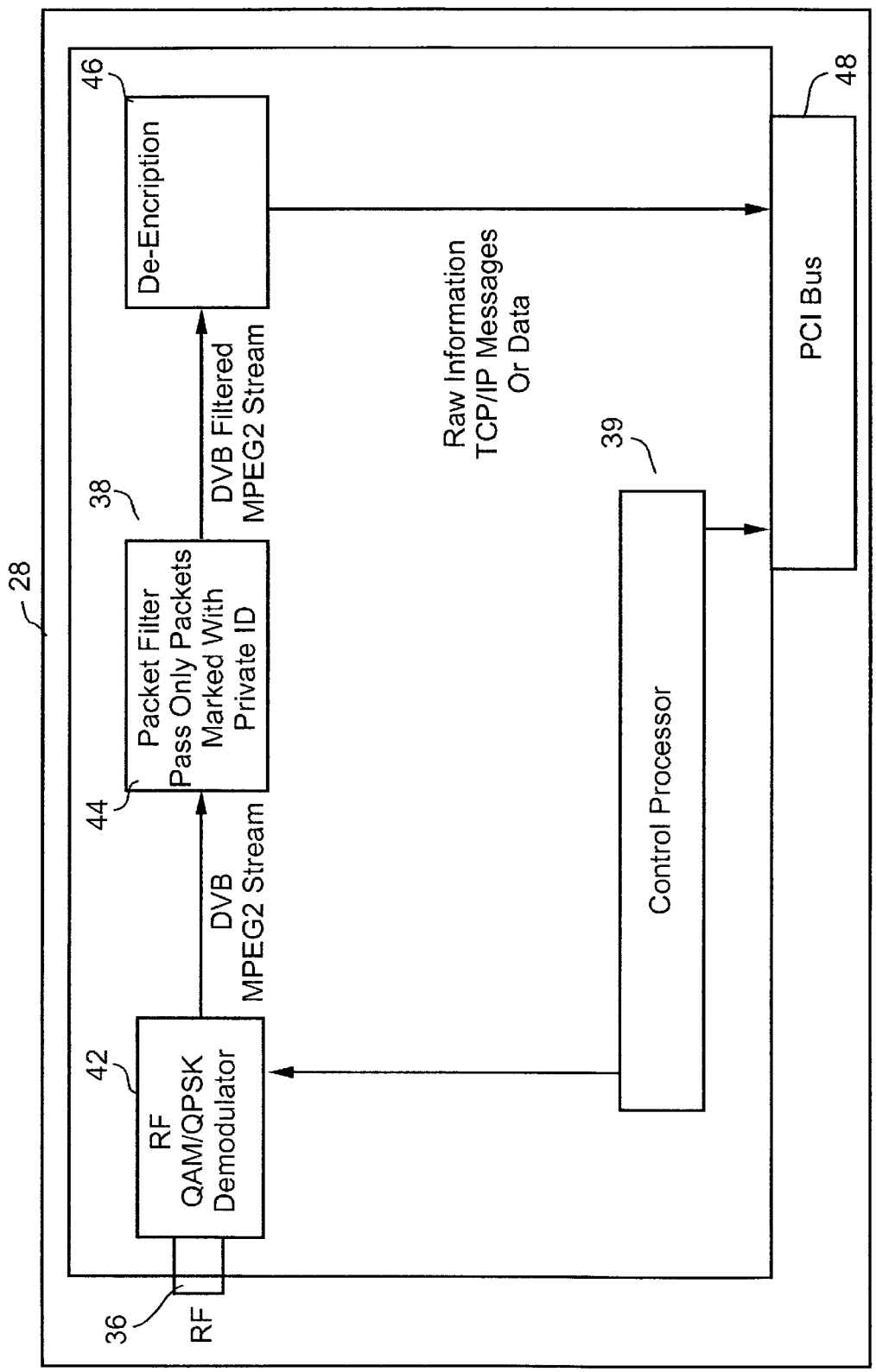
FIG. 2 is a diagram of a broadband receiver for use within the system of FIG. 1.

The encoded data is then sent to the indicated IP address of client device 12 on broadband network 18, and is received by broadband modem 28. Broadband modem 28 must then determine if the data should be passed to client device 12, as well as perform any necessary processing to enable client device 12 to recognize the format of the data. In order to perform these functions, broadband modem 28 has a data receiver 36, a data processor 38 and a data forwarder 39, as shown in FIG. 2.

Data receiver 36 receives the transmitted data from broadband network 18 and performs any processing necessary to place it into a format recognizable by data processor 38. Preferably, this format is DVB MPEG2. Data receiver preferably includes a RF demodulator 42, preferably of the QAM (Quadratic Amplitude Modulation) or QPSK (Quadratic Power Shift Key) types for transformation of transmitted data into the preferred DVB MPEG2format. RF demodulator 42 is required if broadband network 18 is a wireless cable network, because the data must undergo RF modulation for transmission along such a network. Such processing is required to ensure that the data signal is in the correct format for transmission. Thus, the signal processing is done to fulfill the technical requirements of signal transmission, which are in turn dependent upon the exact type of broadband network 18 employed.

Once the data have been transformed into the format recognized by data processor 38, the data is passed on to data processor 38. Data processor 38 processes the data into the format appropriate for client device 12. Data processor 38 includes a packet filter 44. Packet filter 44 examines each packet of data for private hardware identification key 32. If private hardware identification key 32 on the data matches that of client device 12, then the packet of data is accepted and passed through. Thus, only packets of data which have private hardware identification key 32 of client device 12 are passed through to client device 12, ensuring that the data reaches its intended destination.

Data processor 38 optionally includes a de-encryption device 46, which receives the accepted packet of data and performs any de-encryption which is required. The data is then given to data forwarder 39, which passes it to PCI bus 48 of client device 12. Data forwarder 39 also controls RF demodulator 42, ensuring that the data is passed to PCI bus 48 in the correct format. These devices are common to most broadband modems, however, and simply serve to transmit the processed data from broadband modem 28 to PCI bus 48, thereby giving client device 12 full access to the data.

It should be noted that any type of bus can be used in place of PCI bus 48, such as an external box or an ISA (Industry Standard Architecture) bus.

The above description has centered upon a two network system, in which upstream communication from client device occurs via the telephone network, while downstream communication to client device is passed on broadband network. An alternative arrangement would include a broadband network capable of two-way communication. Such a network would both transmit data to, and receive data from, the client device. The communication device would then communicate only with the broadband network for transmission and reception of data. In that case, the communication card would transmit data to the broadband network, and the broadband modem would receive data from the broadband network. Alternatively and preferably, the communication device would include both functions in a single device. Such a system would eliminate some of the problems of IP addressing, as described above, and would also permit much faster upstream communication from the client device.

Figure 3:
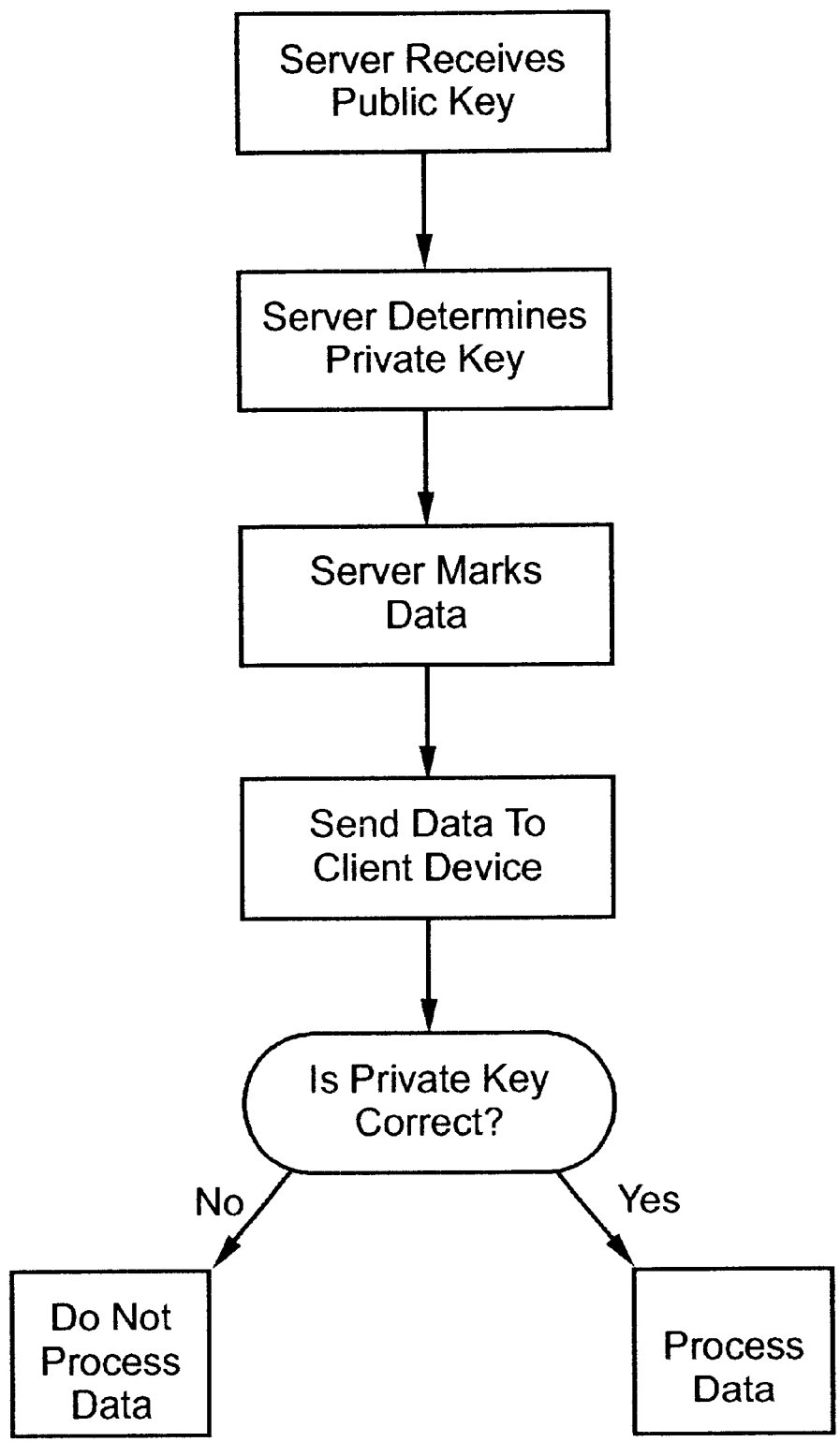
FIG. 3 is a flow-chart of a method of using the system of FIG. 1.

A method of using secure broadband system 10 with either type of network arrangement is given in FIG. 3. In the first step, the server device, which can be the ISP in combination with the access server and the transmitter gateway, for example, receives a public hardware identification key from the client device.

In the second step, the server device determines a private hardware identification key from the public hardware identification key, for example by using a look-up table.

In the third step, the server device marks the data to be transmitted with the private hardware identification key, such that the client device only receives data marked with the private hardware identification key. Preferably, the step of marking the data includes encryption of the data with the private hardware identification key. Alternatively and preferably, the data is marked with the public hardware identification key in addition to the private hardware identification key.

In the fourth step, the marked data is sent to the client device, which can only receive and process data marked with the correct private hardware identification key. Thus, this method of using two hardware keys is both secure and simple, since only one key is transmitted, yet both keys are still readily available to the server device.

It will be appreciated that the above descriptions are intended only to serve as examples, and that many other embodiments are possible within the spirit and the scope of the present invention.

What is claimed is:

1. A system for secure broadband communication, comprising:
    (a) a server device for transmitting data; and
    (b) a client device including a broadband modem for receiving data, said broadband modem including:
        (i) a public hardware identification key for being sent to said server device, such that said client device is identified by said public hardware identification key and such that said server device permits transmission to said client device through said broadband modem according to said public hardware identification key; and
        (ii) a private hardware identification key for controlling reception of data by said client device through said broadband modem, said private hardware identification key being known by said server device, such that substantially only data being marked by said private identification key is passed to said client device from said server device by said broadband modem;
    wherein the data are encrypted with said private hardware identification key by said server device, such that only said broadband modem can de-encrypt the data to a format which recognizable by said client device.

2. The system of claim 1, wherein the data are encrypted with both said private hardware identification key and said public hardware identification key.

3. The system of claim 1, wherein the data is marked both with said public hardware identification key and said private hardware identification key.

4. The system of claim 1, wherein said server device includes an access server and a transmitter gateway, said access server featuring a database of public and private hardware identification keys such that said public identification key of said client device is used to determine said private hardware identification key of said client device, said private hardware identification key being given to said transmitter gateway such that said transmitter gateway marks said data with said private hardware identification key.

5. The system of claim 4, wherein said transmitter gateway further encrypts said data with said private hardware identification key.

6. The system of claim 4, wherein said transmitter gateway further encrypts said data with both said private hardware identification key and said public hardware identification key.

7. The system of claim 1, wherein said broadband modem includes a packet filter for determining if said data is marked with said private hardware identification key, such that said packet filter passes said data to said client device substantially only if said data is marked with said private hardware identification key.

8. The system of claim 1, wherein said client device further includes a communication card for sending data to said server device, such that said communication card sends said public hardware identification key to said server device.

9. The system of claim 1, wherein both said private hardware identification key and said public hardware identification key are unique.

10. A method of marking transmitted data for reception by a client device, the method including the steps of:
   (a) receiving a public hardware identification key from the client device;
   (b) determining a private hardware identification key from said public hardware identification key; and
   (c) marking the data to be transmitted with said private hardware identification key, such that the client device only receives data marked with said private hardware identification key;
wherein the data are encrypted with said private-hardware identification key.

11. The method of claim 10, wherein both said private hardware identification key and said public hardware identification key are unique.

12. A system for secure broadband communication, comprising:
   (a) a server device for transmitting data; and
   (b) a client device including a broadband modem for receiving data, said broadband modem including:
      (i) a public hardware identification key for being sent to said server device, such that said client device is identified by said public hardware identification key and such that said server device permits transmission to said client device through said broadband modem according to said public hardware identification key; and
      (ii) a private hardware identification key for controlling reception of data by said client device through said broadband modem, said private hardware identification key being known by said server device, such that substantially only data being marked by said private identification key is passed to said client device from said server device by said broadband modem;
wherein the data are encrypted with both said private hardware identification key and said public hardware identification key, such that only said broadband modem can de-encrypt the data to a format which is recognizable by said client device.

13. The system of claim 12, wherein the data is marked both with said public hardware identification key and said private hardware identification key.

14. The system of claim 12, wherein said server device includes an access server and a transmitter gateway, said access server featuring a database of public and private hardware identification keys such that said public identification key of said client device is used to determine said private hardware identification key of said client device, said private hardware identification key being given to said transmitter gateway such that said transmitter gateway marks said data with said private hardware identification key.

15. The system of claim 14, wherein said transmitter gateway further encrypts said data with said private hardware identification key.

16. The system of claim 14, wherein said transmitter gateway further encrypts said data with both said private hardware identification key and said public hardware identification key.

17. The system of claim 12, wherein said broadband modem includes a packet filter for determining if said data is marked with said private hardware identification key, such that said packet filter passes said data to said client device substantially only if said data is marked with said private hardware identification key.

18. The system of claim 12, wherein said client device further includes a communication card for sending data to said server device, such that said communication card sends said public hardware identification key to said server device.

19. The system of claim 12, wherein both said private hardware identification key and said public hardware identification key are unique.

20. A method of marking transmitted data for reception by a client device, the method including the steps of:
   (a) receiving a public hardware identification key from the client device;
   (b) determining a private hardware identification key from said public hardware identification key; and
   (c) marking the data to be transmitted with said private hardware identification key, such that the client device only receives data marked with said private hardware identification key;
wherein the data are encrypted with both said private hardware identification key and said public hardware identification key.

21. The method of claim 20, wherein both said private hardware identification key and said public hardware identification key are unique.

22. A system for secure broadband communication, comprising:
   (a) a server device for transmitting data; and
   (b) a client device including a broadband modem for receiving data, said broadband modem including:
      (i) a public hardware identification key for being sent to said server device, such that said client device is identified by said public hardware identification key and such that said server device permits transmission to said client device through said broadband modem according to said public hardware identification key; and
      (ii) a private hardware identification key for controlling reception of data by said client device through said broadband modem, said private hardware identification key being known by said server device, such that substantially only data being marked by said private identification key is passed to said client device from said server device by said broadband modem;
wherein said broadband modem includes a packet filter for determining if said data is marked with said private hardware identification key, such that said packet filter passes said data to said client device substantially only if said data is marked with said private hardware identification key.

23. The system of claim 22, wherein the data are encrypted with said private hardware identification key by said server device, such that only said broadband modem can de-encrypt the data to a format which is recognizable by said client device.

24. The system of claim 22, wherein the data are encrypted with both said private hardware identification key and said public hardware identification key.

25. The system of claim 22, wherein the data is marked both with said public hardware identification key and said private hardware identification key.

26. The system of claim 22, wherein said server device includes an access server and a transmitter gateway, said access server featuring a database of public and private hardware identification keys such that said public identification key of said client device is used to determine said private hardware identification key of said client device, said private hardware identification key being given to said transmitter gateway such that said transmitter gateway marks said data with said private hardware identification key.

27. The system of claim 26, wherein said transmitter gateway further encrypts said data with said private hardware identification key.

28. The system of claim 26, wherein said transmitter gateway further encrypts said data with both said private hardware identification key and said public hardware identification key.

29. The system of claim 22, wherein said client device further includes a communication card for sending data to said server device, such that said communication card sends said public hardware identification key to said server device.

30. The system of claim 22, wherein both said private hardware identification key and said public hardware identification key are unique.

* * * * *